US011571998B2

(12) United States Patent
Binner

(10) Patent No.: US 11,571,998 B2
(45) Date of Patent: Feb. 7, 2023

(54) VEHICLE SEAT FOR A MOTOR VEHICLE

(71) Applicant: Volkswagen Aktiengesellschaft, Wolfsburg (DE)

(72) Inventor: Friederike Binner, Weddel (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 17/244,612

(22) Filed: Apr. 29, 2021

(65) Prior Publication Data

US 2021/0245635 A1 Aug. 12, 2021

Related U.S. Application Data

(63) Continuation of application No. PCT/EP2019/079340, filed on Oct. 28, 2019.

(30) Foreign Application Priority Data

Oct. 29, 2018 (DE) ..................... 10 2018 218 494.1

(51) Int. Cl.
*A47C 7/46* (2006.01)
*B60N 2/02* (2006.01)
*B60N 2/56* (2006.01)
*B60N 2/20* (2006.01)

(52) U.S. Cl.
CPC ............ *B60N 2/5657* (2013.01); *B60N 2/20* (2013.01)

(58) Field of Classification Search
CPC ....... B60N 2/62; B60N 2/0284; B60N 2/5657
See application file for complete search history.

(56) References Cited

U.S. PATENT DOCUMENTS

| 4,773,703 | A | 9/1988 | Krügener et al. | |
| 6,224,150 | B1* | 5/2001 | Eksin | B60N 2/5635 297/180.12 |
| 6,848,742 | B1 | 2/2005 | Aoki et al. | |
| 7,192,087 | B2* | 3/2007 | Adragna | B60N 2/62 297/284.11 |
| 7,669,928 | B2* | 3/2010 | Snyder | B60N 2/0232 297/283.2 |
| 8,128,167 | B2* | 3/2012 | Zhong | B60N 2/62 297/284.11 |

(Continued)

FOREIGN PATENT DOCUMENTS

CN 1526585 A 9/2004
CN 203305853 U 11/2013
(Continued)

OTHER PUBLICATIONS

Chinese Office Action dated Jun. 30, 2022 in corresponding application 201980057453.9.

*Primary Examiner* — Shin H Kim
(74) *Attorney, Agent, or Firm* — Muncy, Geissler, Olds & Lowe, P.C.

(57) ABSTRACT

A vehicle seat for a motor vehicle, with a seat frame that can be attached to a vehicle floor, with a seat part supported by the seat frame, and with a ventilating device that has at least one controllable air-conveying device and at least one air outlet device flow-connected to the air-conveying device. Provision is made that a seat part element that lengthens the seat part is mounted on the seat frame so as to be longitudinally movable relative to the seat part, and that the seat part element has the ventilating device.

11 Claims, 2 Drawing Sheets

(56) References Cited

U.S. PATENT DOCUMENTS

| | | | |
|---|---|---|---|
| 9,010,858 B2* | 4/2015 | Wegelmann | B60N 2/0284 |
| | | | 297/DIG. 8 |
| 9,039,085 B2 | 5/2015 | Aselage | |
| 9,321,373 B2* | 4/2016 | Sakata | B60N 2/62 |
| 9,421,885 B2* | 8/2016 | Wiegelmann | B60N 2/0284 |
| 9,527,418 B2* | 12/2016 | Sachs | B60N 2/5642 |
| 9,694,716 B2 | 7/2017 | Masuda | |
| 9,738,191 B2 | 8/2017 | Langensiepen et al. | |
| 10,286,824 B2* | 5/2019 | Boland | B60N 2/62 |
| 10,391,910 B2* | 8/2019 | Line | B60N 2/682 |
| 10,434,908 B2* | 10/2019 | Akaike | A47C 7/5062 |
| 10,639,958 B2* | 5/2020 | Tsuzaki | B60N 2/5657 |
| 10,703,225 B2* | 7/2020 | Ito | B60N 2/99 |
| 10,717,371 B2* | 7/2020 | Tsukamoto | B60N 2/986 |
| 10,759,307 B2* | 9/2020 | Reader | B60N 2/0232 |
| 10,773,624 B2* | 9/2020 | Morrow | B60N 2/686 |
| 10,800,292 B2* | 10/2020 | Tsukamoto | B60N 2/5858 |
| 11,021,090 B2* | 6/2021 | Humer | A47C 7/503 |
| 11,059,407 B2* | 7/2021 | Tait | B60N 2/0284 |
| 11,091,074 B1* | 8/2021 | Jeong | B60N 2/58 |
| 2004/0195870 A1* | 10/2004 | Bohlender | F04D 17/16 |
| | | | 297/180.1 |
| 2005/0093347 A1* | 5/2005 | Bajic | B60N 2/5635 |
| | | | 297/180.13 |
| 2005/0140189 A1* | 6/2005 | Bajic | B60N 2/5635 |
| | | | 297/180.1 |
| 2006/0061167 A1 | 3/2006 | Adragna et al. | |
| 2011/0163583 A1* | 7/2011 | Zhong | B60N 2/62 |
| | | | 297/337 |
| 2012/0261974 A1* | 10/2012 | Yoshizawa | B60N 2/5657 |
| | | | 297/452.42 |
| 2012/0267937 A1 | 10/2012 | Sahashi | |
| 2013/0020841 A1 | 1/2013 | Oota | |
| 2014/0265479 A1* | 9/2014 | Bennett | B60N 2/919 |
| | | | 297/217.4 |
| 2015/0069811 A1 | 3/2015 | Sachs et al. | |
| 2016/0339806 A1* | 11/2016 | Popescu | B60N 2/0284 |
| 2016/0347219 A1* | 12/2016 | Akaike | B60N 2/5657 |
| 2018/0056834 A1 | 3/2018 | Line et al. | |
| 2018/0162243 A1 | 6/2018 | Akaike et al. | |

FOREIGN PATENT DOCUMENTS

| | | |
|---|---|---|
| CN | 104703840 A | 6/2015 |
| DE | 102004004388 B3 | 5/2005 |
| DE | 212004000036 U1 | 10/2006 |
| DE | 102006054860 A1 | 5/2008 |
| DE | 102010005728 A1 | 8/2010 |
| DE | 102012005378 A1 | 11/2012 |
| DE | 102011114933 B4 | 1/2014 |
| DE | 102015010701 A1 | 3/2016 |
| DE | 102016213558 A1 | 2/2017 |
| EP | 1974991 A2 | 10/2008 |
| JP | 2005253705 A | 9/2005 |
| JP | 2012183154 A | 9/2012 |

* cited by examiner

VEHICLE SEAT FOR A MOTOR VEHICLE

This nonprovisional application is a continuation of International Application No. PCT/EP2019/079340, which was filed on Oct. 28, 2019 and which claims priority to German Patent Application No. 10 2018 218 494.1, which was filed in Germany on Oct. 29, 2018 and which are both herein incorporated by reference.

BACKGROUND OF THE INVENTION

Field of the Invention

The present invention relates to a vehicle seat for a motor vehicle, with a seat frame that can be attached to a vehicle floor, with a seat part supported by the seat frame, and with a ventilating device that has at least one controllable air-conveying device and an air outlet device flow-connected to the air-conveying device.

Description of the Background Art

Vehicle seats of the abovementioned type are known from the prior art. Thus, for example, published patent application DE 10 2010 005 728 A1 shows a seat part assembly for a seat cushion part of a vehicle seat, with an air-permeable tensioned layer that is held on a seat part support and is covered by a covering. The seat cushion part and the backrest part each have a ventilating device associated with them, which serves to produce an airflow through the cushion and covering. Published patent application DE 10 2012 005 378 A1 also discloses a vehicle seat with a ventilating device that is associated with the seat part.

SUMMARY OF THE INVENTION

It is therefore an object of the present invention to provide an improved vehicle seat that further improves comfort for the user through improved ventilation.

The object of the invention is attained by a vehicle seat that has the advantage that seating comfort for the user is improved through a variable adjustment of the seat part and, in particular, can be optimized ergonomically. In addition, it is ensured that the user located on the vehicle seat can advantageously be cooled or air conditioned, despite the proposed adjustability of the seat part. According to the invention, this is achieved by the means that a seat part element that lengthens the seat part is mounted on the seat frame so as to be longitudinally movable relative to the seat part, and that the seat part element has the ventilating device. The ventilating device is therefore integrated into the movable seat part element. The longitudinal movement of the seat part element allows the seat area of the seat part as a whole to be lengthened or shortened, depending on the direction in which the seat part element is moved. As a result of the fact that a separate ventilating device is now provided in the seat part element, ventilation there is also achieved simply and advantageously.

The seat part element has a support plate that is mounted on the seat frame so as to be movable, in particular so as to be longitudinally movable, on which plate is arranged a seat cushion, wherein the air-conveying device is arranged on the support plate in the seat cushion. As a result, the air-conveying device is integrated into the seat part element in a manner that is advantageous in terms of installation space, and is protected by the seat cushion on the one hand and by the support plate on the other hand. The support plate additionally offers an advantageous stability of the air-conveying device in the vehicle seat and also serves, in particular, to support the seat cushion. Owing to the support plate, it is simple to mount the seat element so as to be movable on the seat frame. In particular, a sliding joint, in particular a rail guide, is implemented between the support plate and seat frame for this purpose. Preferably the support plate is mounted on a base plate so as to be movable, in particular so as to be longitudinally movable, and the base plate is attached to, or can be attached to, the seat frame. In particular, the base plate is screwed onto the seat frame. Owing to the provision of the base plate, the advantage is achieved that the sliding guide is incorporated in the base plate and the support plate, for example in the form of a rail guide, so that it is no longer necessary to provide the seat frame itself with a rail guide. The design effort and the manufacturing costs are reduced in this way.

The air-conveying device can be encased at least in some regions in a cut foam. The cut foam offers a possibility that is simple in design terms to ensure, with only low weight, protection for the air-conveying device and to increase the sense of comfort, in particular on account of an improved cushioning of the air-conveying device in the vehicle seat. The cut foam can be customized easily to the conditions of the vehicle seat and, in particular, of the air-conveying device.

The seat cushion can have one or more air ducts that lead from the air-conveying device and/or the cut foam to the air outlet device. It is ensured by means of the air ducts that the airflow provided by the air-conveying device is of benefit to the user of the vehicle seat. By means of the one or more air ducts, the airflow is advantageously routed specifically to the air outlet device so that flow losses are avoided.

The cut foam can have at least one additional air duct, which is flow-connected to the air-conveying device on one side and to the one or more air ducts of the seat cushion on the other side. A flow of air through the cut foam to the air outlet device is accomplished by this means. Owing to the use of cut foam, the air ducts or the at least one air duct, which directly adjoins the air-conveying device, can be realized especially economically.

Furthermore, provision can be made that the air outlet device is implemented as an air-permeable tensioned layer, in particular textile layer, of an upholstery covering of the seat part element. As a result, the air outlet device is advantageously integrated into the upholstery covering, and offers an advantageous airflow comfort for a person on the vehicle seat.

In particular, the air-conveying device may be implemented as an electric fan, wherein the fan can be arranged at least substantially in the center on the support plate. On account of the implementation as an electric fan, the air-conveying device can be controlled and activated at any time as needed. In particular, in this way the seat part element can be ventilated individually, in particular independently of any ventilating devices that may be present in the seat part and/or the backrest.

The at least one additional air duct of the cut foam can extend at least substantially in the plane of the seat part element. As a result, the additional air duct serves, in particular, to distribute the airflow provided by the air-conveying device within the seat part element. It is ensured that the airflow advantageously reaches large regions of the seat part element.

Furthermore, the air ducts of the seat cushion can extend substantially perpendicularly to the plane of the seat part element. As a result, the airflow made available is directed outward at least substantially perpendicularly to the seat area of the seat cushion in order to ensure advantageous ventilation of the person on the vehicle seat.

Especially preferably, the fan has a housing that is screwed and/or snapped onto the support plate. As a result, simple installation in the air-conveying device on the support plate of the seat part element is ensured.

Furthermore, provision is preferably made that a backrest is arranged, in particular mounted so as to be tiltable, with respect to the seat part. As a result, a vehicle seat is provided that offers both a seat part and a backrest in order to ensure advantageous seating comfort. In this design, the seat part and/or the backrest each have an additional ventilating device so that the seat part, backrest, and seat part element can be ventilated independently of one another, ensuring the greatest possible ventilating comfort.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
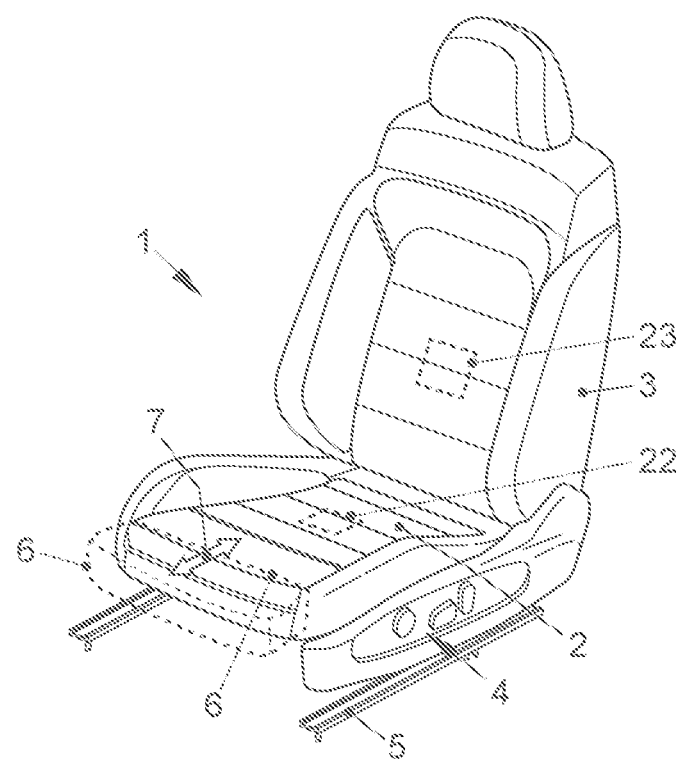
FIG. 1 shows an exemplary vehicle seat in a perspective view.

In a simplified perspective representation, FIG. 1 shows a vehicle seat 1 for a motor vehicle that has a seat part 2 and a backrest 3 that is mounted on/with respect to the seat part 2 so as to be tiltable. The seat part 2 additionally has a seat frame 4, by which means the vehicle seat 1 can be attached to a vehicle floor of a motor vehicle. The seat frame 4 has guide rails 5 for this purpose, which can be locked in place, in particular screwed, on the vehicle floor. The guide rails 5 permit a longitudinal movement of the vehicle seat 1 along the guide rails 5 in order to adjust the seat position in the longitudinal extent in the vehicle interior.

Also arranged on the seat frame 4 so as to be longitudinally movable is a seat part element 6 that lengthens the seat part 2 and that is movable as shown by a double-headed arrow 7 and a second position of the seat part element 6 in dashed lines in FIG. 1.

Figure 2:
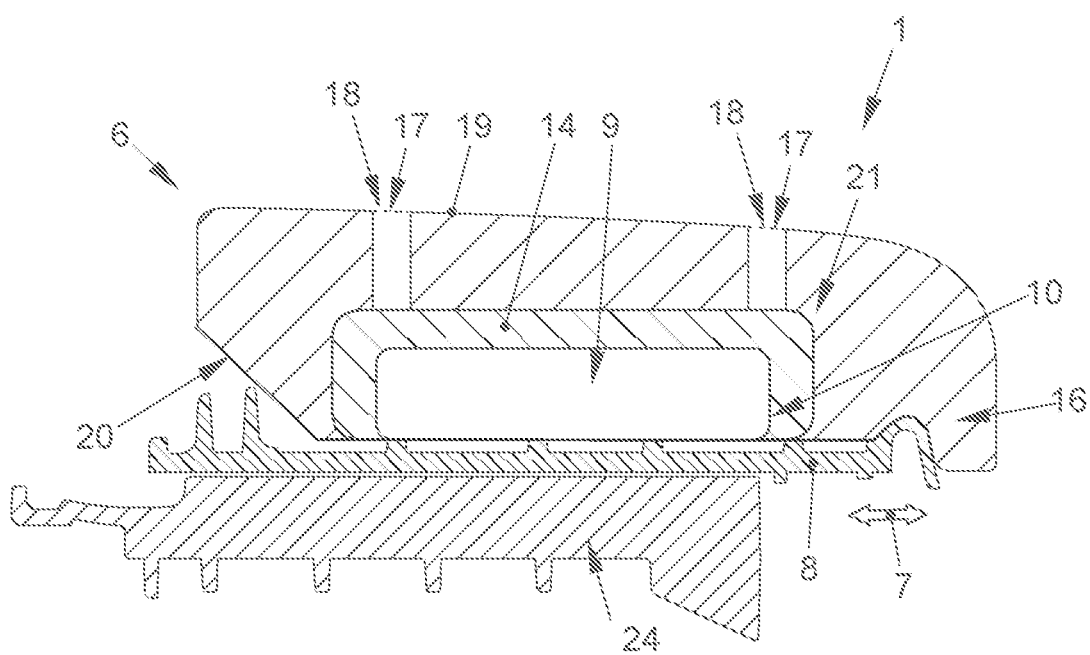
FIG. 2 shows a simplified sectional view through the vehicle seat.

FIG. 2 shows a longitudinal sectional view through the vehicle seat 1 in the region of the seat part element 6. The seat part element 6 has a support plate 8, which is mounted on the seat frame 4 so as to be longitudinally movable according to double-headed arrow 7. Preferably, the support plate 8 is mounted on a base plate 24 so as to be movable, wherein the base plate 24 can be attached to or is attached to, in particular can be screwed to or is screwed to, the seat frame 4. In this design the base plate 24 advantageously has a rail guide for the support plate 8. For this purpose, the base plate 24, for example, has one or more groove-like recesses arranged parallel to one another, in which one or more pin-shaped or fin-shaped projections of the support plate 8 are movably enclosed. Arranged on and attached to the support plate 8 is an air-conveying device 9. In particular, a housing 10 of the air-conveying device 9 is screwed or snapped onto the support plate 8 for this purpose.

Figure 3:
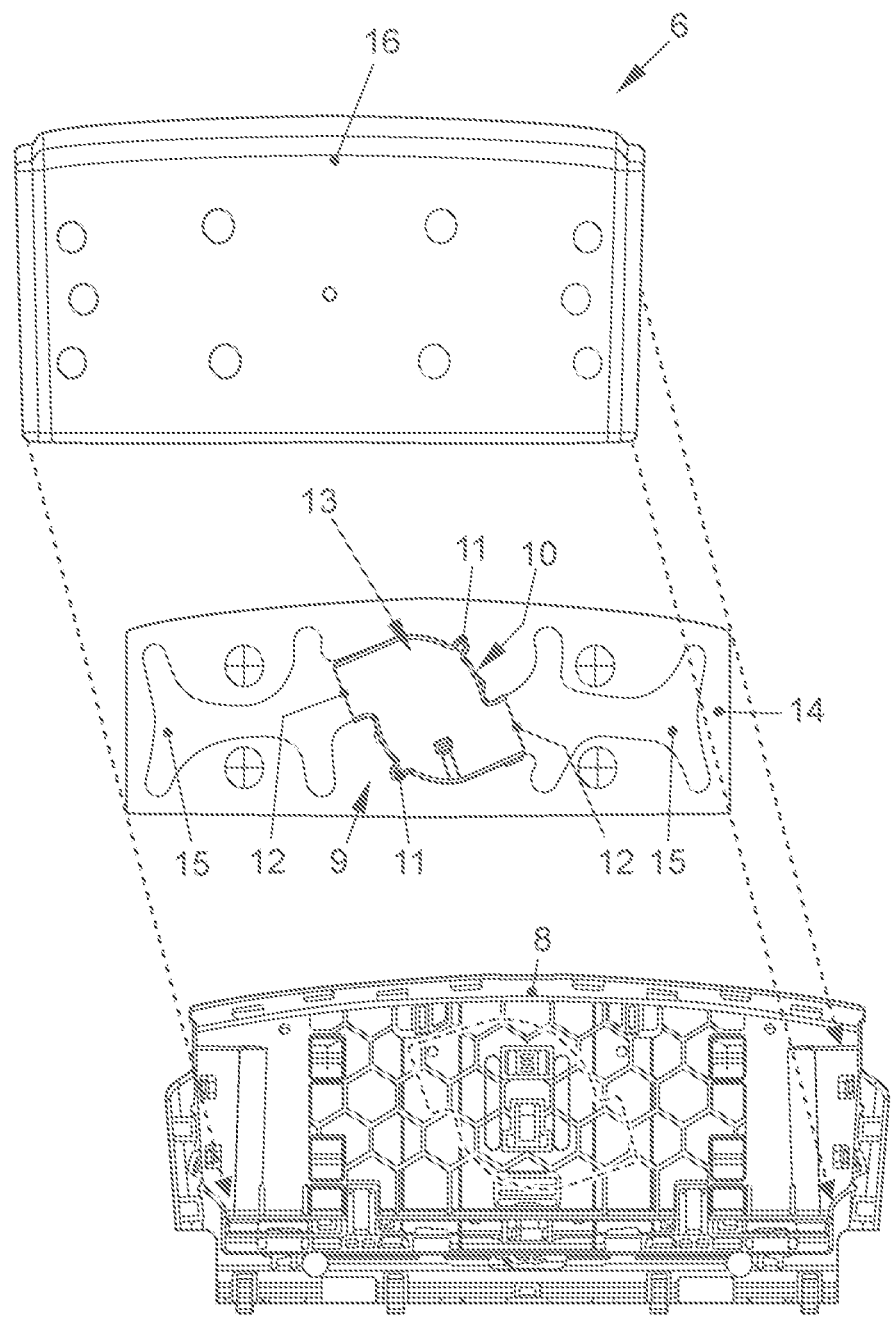
FIG. 3 shows an exploded view of an advantageous seat part element of the vehicle seat.

FIG. 3 shows the seat part element 6 in an exploded view for the purpose of further explanation. In the present exemplary embodiment, the housing 10 of the air-conveying device 9 is designed to be S-shaped, and has screw openings 11 for screwing onto the support plate 8.

The housing 10 has two discharge openings 12, which are formed on sides of the housing that are turned away from one another. Arranged in the housing 10 is an electric fan 13, which has an electric motor that is coupled to a fan impeller in order to create, when needed, an airflow that can flow out of the housing 10 through the discharge openings 12.

The housing 10 is encased by a cut foam 14, as shown in FIGS. 2 and 3. The cut foam has, in particular on its underside facing the support plate 8, a recess or indentation for the housing 10, as well as air ducts 15 proceeding outward from the recess, each of which extends to a side of the seat part element 6. In this design, the air ducts extend at least substantially in the plane of the seat part element 6 in such a manner that large regions of the seat part element are reached by the ducts 15. The cut foam 14 extends at least substantially over the entire width and length of the support plate 8 for this purpose. In particular, the cut foam 14 as a whole is designed to be taller than the housing 10 of the air-conveying device 9, and the recess or indentation is produced on the underside facing the support plate 8. This achieves the result that the housing 10 is covered by the cut foam 14, and as a result the fan 13 is additionally protected by the cut foam 14. Furthermore, comfort is also increased, because the cut foam 14 cannot collapse from the seat cushion 16 into the air ducts 15.

As is especially apparent in FIG. 2, the cut foam 14 is covered by a seat cushion 16, which likewise has air ducts 17 that are flow-connected to the air ducts 15. However, the air ducts 17 extend at least substantially perpendicularly to the plane of the seat part element 6, and lead to air outlet devices 18 of the seat part element 6. In accordance with the present exemplary embodiment, the air outlet devices 18 have an air-permeable tensioned layer 19 of the seat cushion 16, which constitutes a textile layer and the seat surface, and is designed to be perforated at least in the region of the air ducts 17 so that the airflow provided by the fan 13 can flow out of the seat part element 6 through the air ducts 15 and 17 as well as the perforated tensioned layer 19, and ventilate or air condition a person on the vehicle seat 1.

In addition, optionally arranged between the seat cushion 16, the cut foam 14, and the air-conveying device 9 on the one hand, and the support plate 8 on the other hand, is a sealing mat 20, which is implemented, in particular, as a sealing nonwoven fabric, and which prevents air from escaping out of the air ducts 15, 17 towards the seat frame 4.

The air-conveying device 9, together with the air ducts 15 and 17 as well as the air outlet devices 18, forms an advantageous ventilating device 21 of the seat part element 6. It ensures that the person on the vehicle seat 1 can be supplied with or provided with air-conditioned or fresh air, independently of the slide position of the seat part element 6. The proposed exemplary embodiment achieves the result that the ventilating device 21 is integrated into the seat part element 6 so as to optimize installation space. Owing to the moving of the seat part element 6, the user has the possibility to adjust the seat part length, and thereby to achieve the maximum possible seating comfort, without having to give up air conditioning or ventilation, in particular of the knee area, in the process.

Advantageously, a ventilating device 22 and 23, respectively, are additionally arranged in the backrest 3 and in the seat part 2, and are designed, in particular, like the ventilating device 21 and integrated into the cushioning of the backrest 3 or of the seat part 2, respectively. It is ensured by this means that the person on the vehicle seat 1 can advantageously be supplied with fresh air and/or air conditioned air.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle seat for a motor vehicle, the vehicle seat comprising:
   a seat frame adapted to be attached to a vehicle floor;
   a seat part supported by the seat frame, the seat part having a seat cushion;
   a ventilating device that has at least one controllable air-conveying device and at least one air outlet device flow-connected to the air-conveying device; and
   a seat part element that lengthens the seat part and is mounted on the seat frame so as to be longitudinally movable relative to the seat part, the seat part element having the ventilating device,
   wherein the seat part element has a support plate which is mounted on the seat frame so as to be movable and on which is arranged a seat part seat cushion, wherein the air-conveying device is arranged on the support plate in the seat part seat cushion.

2. The vehicle seat according to claim 1, wherein the air-conveying device is encased at least in some regions of the seat part seat cushion by a cut foam.

3. The vehicle seat according to claim 2, wherein the seat part seat cushion has at least one air duct that leads from the cut foam to the at least one air outlet device.

4. The vehicle seat according to claim 3, wherein the cut foam has at least one additional air duct, which is flow-connected to the air-conveying device and to the at least one air duct of the seat cushion.

5. The vehicle seat according to claim 1, wherein the at least one air outlet device is implemented as an air-permeable tensioned layer or a textile layer of an upholstery covering of the seat part element.

6. The vehicle seat according to claim 1, wherein the air-conveying device is implemented as an electric fan, wherein the electric fan is arranged at least substantially in the center on the support plate.

7. The vehicle seat according to claim 4, wherein the at least one additional air duct of the cut foam extends at least substantially in the plane of the seat part element.

8. The vehicle seat according to claim 3, wherein the at least one air duct of the seat part seat cushion extends at least substantially perpendicularly to the plane of the seat part element.

9. The vehicle seat according to claim 6, wherein the electric fan has a housing that is screwed and/or snapped onto the support plate.

10. The vehicle seat according to claim 1, wherein a backrest is arranged or mounted so as to be tiltable on the seat part.

11. The vehicle seat according to claim 10, wherein the seat part and/or the backrest each have an additional ventilating device.

* * * * *